United States Patent
Williams

[15] 3,673,941
[45] July 4, 1971

[54] CAMERA COCKING MECHANISM
[72] Inventor: Francis A. Williams, Rochester, N.Y.
[73] Assignee: Eastman Kodak Company, Rochester, N.Y.
[22] Filed: Dec. 17, 1970
[21] Appl. No.: 99,184

[52] U.S. Cl............................................95/31 AC, 95/11 L
[51] Int. Cl......................................G03b 1/04, G03b 17/42
[58] Field of Search..............95/31 R, 31 AC, 31 FL, 31 FM, 95/11 R, 11 L; 74/437

[56] References Cited

UNITED STATES PATENTS

| | | | |
|---|---|---|---|
| 996,777 | 7/1911 | Linnartz | 74/437 |
| 3,552,286 | 1/1971 | Horton et al. | 95/11 L |
| 1,237,736 | 8/1917 | Aborn | 74/437 X |
| 3,057,277 | 10/1962 | Swarofsky et al. | 95/31 R |
| 3,487,758 | 1/1970 | Rigolimi et al. | 95/31 AC X |
| 2,309,382 | 1/1943 | Cazin | 95/31 FL |
| 3,416,424 | 12/1968 | Harvey | 95/31 AC |

FOREIGN PATENTS OR APPLICATIONS 482,537 3/1938 Great Britain .....................95/31 FL

*Primary Examiner*—Joseph F. Peters, Jr.
*Attorney*—Robert W. Hampton and J. Addison Mathews

[57] ABSTRACT

A camera mechanism for preparing a camera to effect an exposure, such as by cocking a shutter or by indexing a multilamp flash unit socket. The mechanism employs a single-lobed and spiral-shaped cam or gear in a linkage that translates motion from a drive member, associated with film movement, to the shutter or socket. Substantially one complete revolution of the gear performs its intended functions, and then the gear automatically is disengaged from the drive member to permit further rotation of the member without further influence on such functions. The mechanism is particularly adapted for translating rotational motion, such as from a film-winding drive, either to linear motion or to complex motion including a substantial linear component, for cocking the shutter and indexing the socket. The mechanism is also adapted for metering advancement of film in the camera and for preventing double exposures.

8 Claims, 6 Drawing Figures

FRANCIS A. WILLIAMS
INVENTOR.

ATTORNEYS

FRANCIS A. WILLIAMS
INVENTOR.

BY J. Addisy Mathews
RW Hampton
ATTORNEYS

FRANCIS A. WILLIAMS
INVENTOR.

BY

ATTORNEYS

CAMERA COCKING MECHANISM

CROSS-REFERENCE TO RELATED APPLICATION

Reference is made to commonly assigned, copending U.S. Patent Application Ser. No. 23,642, entitled PHOTOGRAPHIC APPARATUS and filed Mar. 30, 1970 in the name of Donald M. Harvey.

BACKGROUND OF THE INVENTION

1. Field of the Invention

The present invention relates to photographic cameras and more specifically to an improved mechanism for preparing a camera to effect an exposure. The invention has particular utility in cameras including a member that rotates in association with the movement of film in the camera, for translating such rotary motion into motion having a substantial linear component that is suitable for cocking a shutter or indexing a multi-lamp flash unit socket.

2. Description of the Prior Art

It is well known to provide photographic cameras with means for advancing film and simultaneously for priming or setting various other camera components such as shutters or flash devices. It also is known to provide cameras with suitable linkages for translating rotational movement from a film-winding, or other film-associated member, into movement including a substantial linear component, at least in some portion of the linkage, that is useable for cocking a camera shutter or indexing a flashcube socket. Various different types of such mechanisms are disclosed, for example, in commonly assigned U.S. Pat. Nos. 3,319,547; 3,335,651; 3,353,647; and 3,353,468; and in commonly assigned, copending U.S. Patent Application Ser. No. 731,058, entitled FLASH CAMERA, filed on May 22, 1968 in the name of M. S. Montalto now U.S. Pat. No. 3,584,552. A somewhat different but related mechanism for effecting motion translation in a film-metering device is disclosed in commonly assigned, U.S. Patent Application Ser. No. 855,542, entitled FILM METERING MECHANISM, filed Sept. 5, 1969 in the name of H. Ettischer, now U.S. Pat. No. 3,628,432.

In view of the many different approaches exemplified by the abovementioned photographic patents and applications, and by related structures in non-photographic apparatus, it initially would seem that many suitable mechanisms already should exist that would be entirely satisfactory for setting cameras prior to exposure. Actually, however, the unique camera environment presents numerous more subtle problems that have proven to be particularly difficult to solve in an efficient manner. Considering a camera having a rotary film-winding lever that advances film in the camera by winding it onto a take-up spool, and that also effects the cocking of a shutter and indexing of a flashcube socket, it must be remembered that the winding lever moves a different amount, or rotates through a different angular sweep, with each frame of film that is advanced. This results from the increase in the effective diameter of the take-up spool with each successive convolution of film wound thereon, and ordinarily prevents a direct and positive coupling between the winding lever and the shutter or socket, both of which generally require constant amounts of movement prior to each exposure. Of course, this can be accounted for by providing a lost-motion linkage between the winding lever and the shutter or socket, but in doing so it is difficult to retain efficiency when the maximum amount of winding-lever movement available at the beginning of a film roll will no longer be available toward the end of the roll.

A similar problem results from the fact that the cocking of a shutter generally does not require the same amount of movement at the same time as is required for indexing the socket. Thus, at one particular time the force that must be applied to the winding lever may have to be sufficient to cock the shutter, to rotate the flashcube and to effect various other operations, while at some other time, perhaps after completion of the flashcube rotation, such force could be significantly less while still effecting completion of shutter cocking. Again, the uneven distribution of necessary force results in lost efficiency.

These and other problems will become more apparent hereinafter, especially insofar as they relate to the desirability of translating motion from a member that rotates with film movement into motion having a substantial linear component for effecting the cocking of a shutter or the indexing of a flashcube socket.

SUMMARY OF THE INVENTION

In accordance with the present invention, an improved and efficient mechanism is provided for setting a camera prior to an exposure. The camera is set from a member that moves with or in response to the movement of film in the camera, such as a rotatable film-winding lever, by translating the motion of that member through a "spiral-shaped" or "6" cam of suitable configuration to various other camera components, such as a shutter and/or flashcube socket.

In accordance with one feature of the invention, the cam is movable independently of or at least with a different type of motion than that of the member, the latter preferably being rotary motion and the former preferably including a substantial linear movement or component.

In accordance with another feature of the invention, the cam is provided with a particular configuration for effecting a greater mechanical advantage during certain stages in its operation than at other stages. During initial stages, for example, when the greatest forces might be required for both rotating a flashcube socket and cocking a shutter, the mechanical advantage is greatest. At later stages, however, when either one but not both of the socket rotation and shutter cocking are accomplished, the speed of operation is increased in lieu of the lesser needed mechanical advantage.

Other features of the invention include a gear-driven cam of the abovementioned types, a double-exposure-prevention device, and improved means for permitting continued operation of the mechanism for film winding without further influence on its setting functions, once such setting functions are fully accomplished.

Various means for practicing the invention and other advantages and novel features thereof will be apparent from the following detailed description of an illustrative preferred embodiment of the invention, reference being made to the accompanying drawings in which like reference characters denote like elements.

DESCRIPTION OF THE PREFERRED EMBODIMENT

In accordance with the preferred embodiment of the present invention, a simple and reliable camera setting mechanism is provided with a translatable spiral-shaped gear initially engaged at its point of minimum peripheral radius with a corresponding circular drive member. The drive member is adapted to be rotated in unison with the movement of film in the camera, and thereby imparts an opposite rotation to the spiral gear, as well as a displacement of its axis away from the rotating drive member. This displacement then is utilized to effect a similar displacement in a spring-loaded cocking lever that is coupled to one or more camera components for properly setting such components prior to an exposure. As the spiral gear completes a single revolution, the cocking lever reaches its position of maximum displacement, completes its cocking or setting functions, and then rides out of engagement with the circular drive member. The spiral gear then is prevented from re-engaging the circular drive member until after the camera shutter has operated, to permit further rotation of the drive member with further film movement but without further influence on the cocking lever. After an exposure is completed, however, the spiral gear returns to its initial position in engagement with the circular drive member in readiness to prepare the camera for the next exposure.

The drive ratio between the circular drive member and spiral gear is such that the latter completes a single revolution only slightly before the former has rotated through the minimum angle required to advance the film. Accordingly, the manual force required to perform the film advancing and mechanism cocking operation is reduced by utilizing almost all available movement of the drive member to provide power for the mechanism cocking operation. Additionally, the effective diameter of the spiral gear is smallest at the initial stages of its rotation for the greatest mechanical advantage to initiate setting of the camera, but increases for the greatest speed of operation as camera setting is completed and less force is required.

Figure 1:
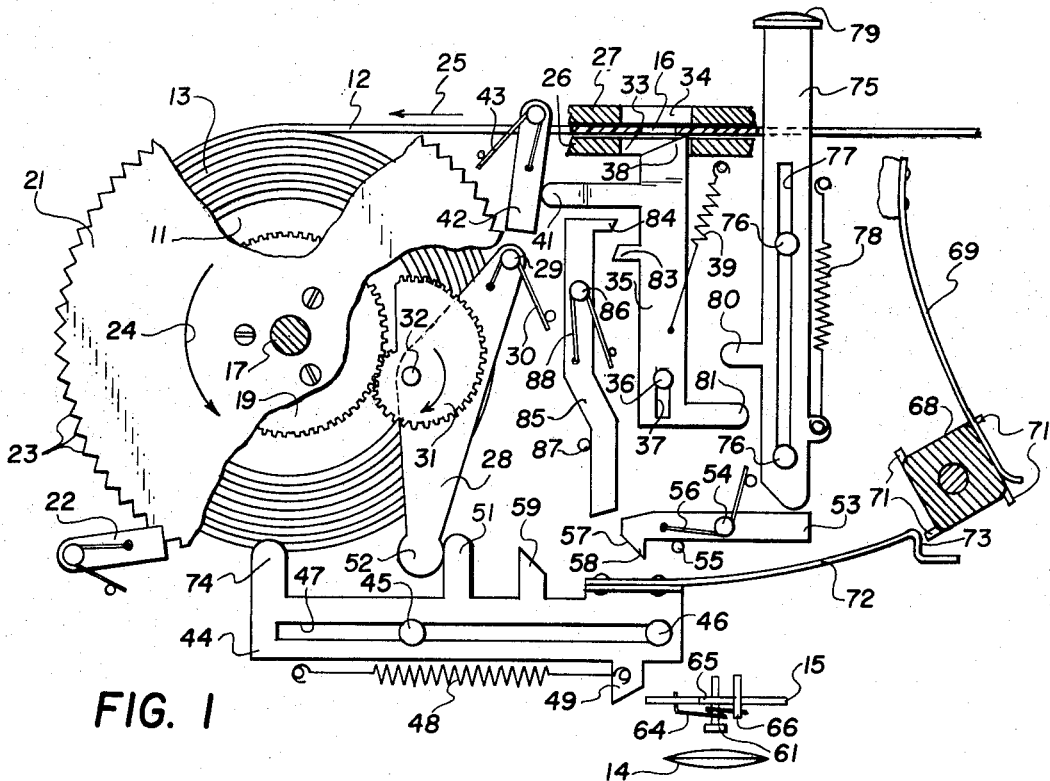
FIG. 1 is a somewhat schematic plan view of a camera mechanism according to a preferred embodiment of the invention with the depicted components shown in their respective positions after a film exposure has been made but before the commencement of the next film advancing operation.
Figure 2:
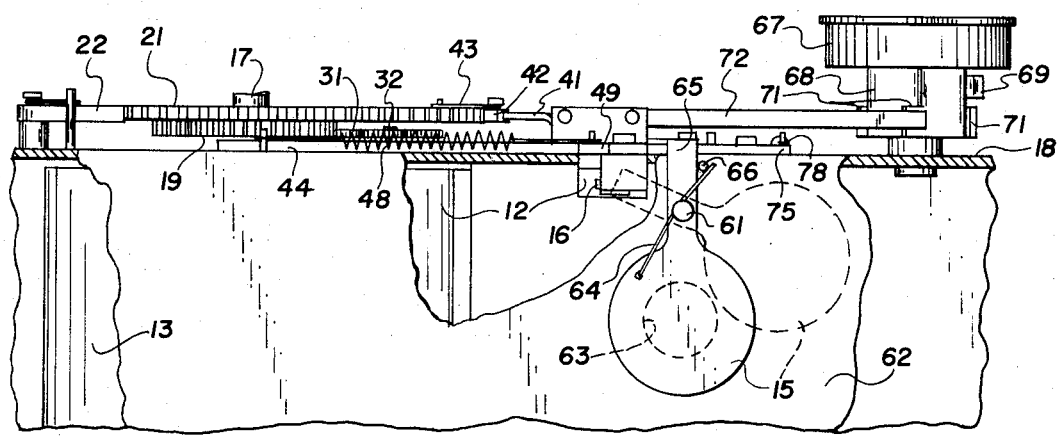
FIG. 2 is a front elevational view of the structure shown in FIG. 1 and includes a fragmentary illustration of the mechanism support plate omitted in the other figures for purposes of clarity.

Referring first to FIGS. 1 and 2 of the accompanying drawings, the preferred embodiment of the invention comprises a rotatable film winding member 11 onto which successive convolutions of an elongate strip of film 12 is wound to define a take-up roll 13 for collecting the film after it has been advanced past an exposure position in alignment with lens 14 and shutter blade 15. The strip of film is provided with a series of uniformly spaced metering perforations 16 and can be contained in a removable film magazine or cartridge, not shown, in a manner well known to those skilled in the art. The film winding member is supported by a shaft 17 rotatably carried by a mechanism plate 18, partially illustrated in FIG. 2 but omitted in the other figures for purposes of clarity. The mechanism plate also supports the other illustrated components of the subject mechanism and is enclosed in an appropriate conventional camera housing, which has been omitted from the drawings to more clearly illustrate the more relevant parts of the mechanism to which the present invention is directed.

A circular driving cam or gear 19 is carried by shaft 17 and is attached to a ratchet wheel 21 for rotation in unison with the winding member 11. A spring-loaded ratchet pawl 22 bears against the adjacent teeth 23 on the periphery of the ratchet wheel to allow the latter to rotate only in the counterclockwise direction shown by arrow 24 in FIG. 1. The toothed edge of the ratchet wheel can be accessible through a slot in the camera housing to allow manual rotation of the winding member or a more conventional winding knob or lever can be connected to shaft 17 for the same purpose. By rotating the winding member, the film can be unwound from a supply roll, not shown, to move in the direction of arrow 25 past the exposure position, where it is held in a flat condition at a focal plane of the camera lens by appropriate front and back support members partially shown at numerals 26 and 27.

A cocking lever 28 is pivotally attached to the mechanism plate by pivot stud 29 and is biased toward gear 19 by a relatively weak hairpin spring 30. A spiral or "6" shaped cam or gear 31 is rotatably attached to the cocking lever in horizontal alignment with gear 19 by a bearing pin 32. Accordingly, when the circular gear and the spiral gear are meshed together, as shown in FIG. 1, counterclockwise rotation of the former causes the latter to rotate clockwise and to displace the cocking lever away from gear 19 because of the spiral configuration of gear 31. While such displacement is pivotal in nature, the length or radius of the cocking lever 28 is selected to provide a substantial linear component of movement at its distal end opposite to pivot stud 29.

Figure 4:
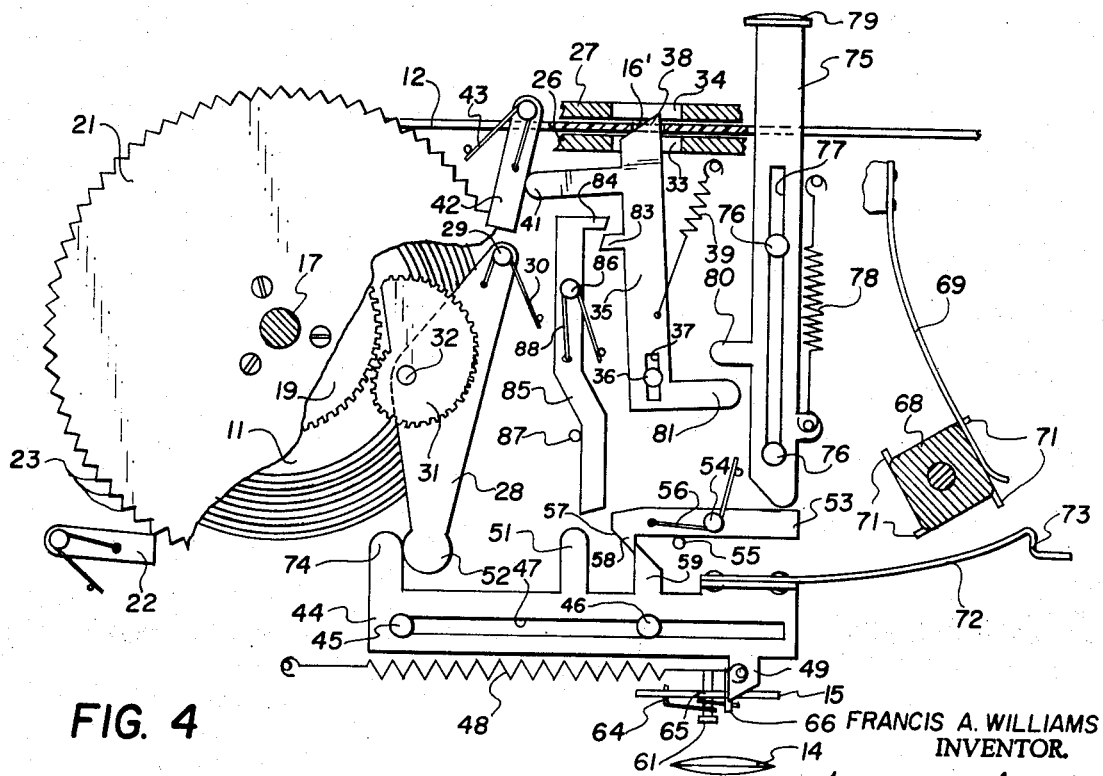
FIG. 4 illustrates the mechanism shown in FIGS. 1 and 3 upon completion of the advancement of the film and shows the manner in which the film metering system temporarily blocks further rotation of the film-winding member.

The front and back support members 26 and 27 are provided with respective opposed openings 33 and 34 with which successive film perforations are aligned. After an exposure has been made but before the next film advancing operation has been commenced, a film perforation is located adjacent to the center of the opposed openings as shown in FIG. 1. A metering member 35 is movably attached to the mechanism plate by a stud 36 extending through an elongate slot 37 and includes an angular tip 38 adapted to be received in opening 33. A coil spring 39 biases the metering member both rearwardly and in a clockwise direction (as viewed in FIG. 1) so that its tip bears against the face of the film adjacent to perforation 16 and against the right edge of opening 33 when the mechanism is in the condition shown in FIG. 1. An ear 41 extends laterally from the metering member and engages a pivotally mounted pawl 42 biased toward the ear by a hairpin spring 43. As illustrated in FIG. 4, the pawl 42 is adapted to engage the periphery of ratchet wheel 21 to block film-winding rotation of the winding member, but it is shown in an inoperative position in FIG. 1.

Operating member 44 is slidably mounted to the mechanism plate by rivets 45 and 46 extending through elongate slot 47 and is biased toward its uncocked position shown in FIG. 1 by a coil spring 48 connected to shutter opening ear 49. In this position, tongue 51 of operating member 44 engages the rounded end 52 of cocking lever 28 and holds the spiral gear 31 in meshing engagement with the circular gear 19.

Figure 3:
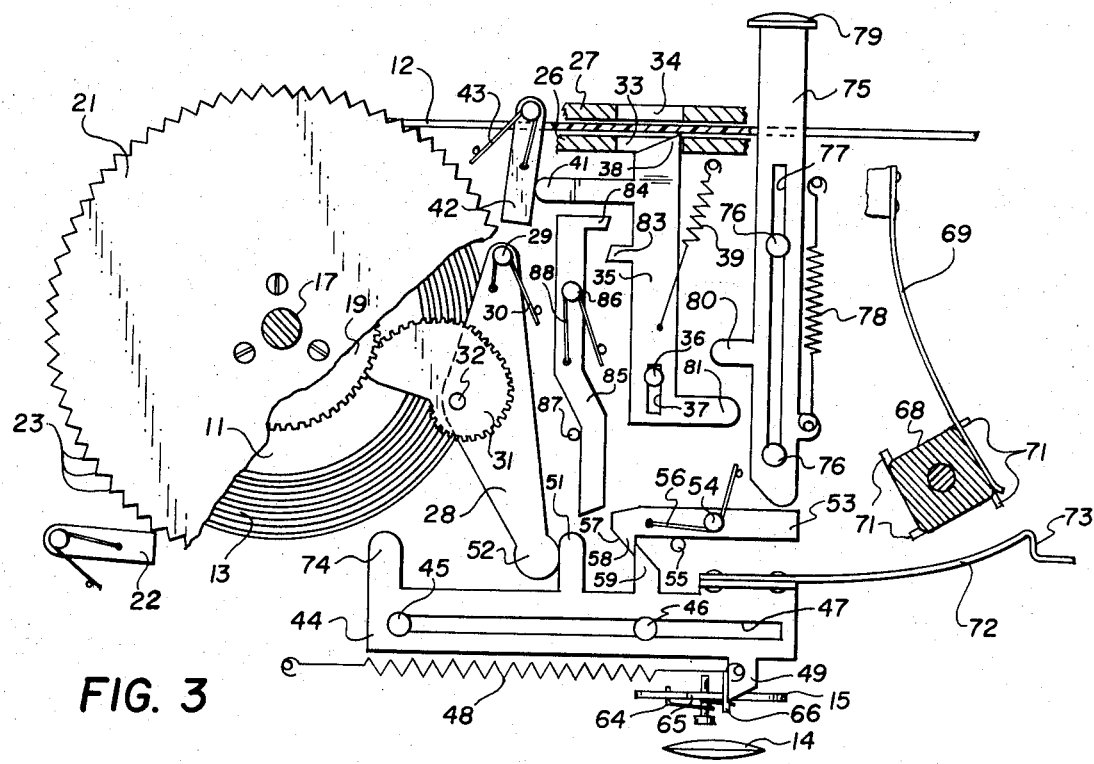
FIG. 3 corresponds to FIG. 1 and shows the positions of the illustrated components when the winding member has rotated just far enough to complete the displacement of the cocking lever.

During the initial winding rotation of the winding member 11, the film slides past the tip of the metering member as that member and pawl 42 remain in the respective positions shown in FIGS. 1 and 3. Simultaneously, the rotation of the spiral gear displaces the cocking lever along a linear path and thereby moves the operating member toward its cocked position in opposition to spring 48. When the spiral gear has rotated through somewhat less than a complete revolution, its largest peripheral increment is meshed with the circular gear, as shown in FIG. 3. Accordingly, the cocking lever is in its position of maximum displacement and the operating member has thereby been moved to its fully cocked position.

A latch dog 53 is pivotally supported adjacent to the operating member by stud 54, and is biased toward stop pin 55 by a relatively weak spring 56. As the operating member moves to its cocked position, the sloped edge 57 of latch dog tooth 58 is engaged by the slope end of latching ear 59 on the operating member and the latch dog is thereby cammed past the latching ear so that the dog can releasably hold the operating member in its cocked position shown in FIG. 3.

As best shown in FIG. 2, shutter blade 15 is aperture attached by a stud 61 to the front wall 62 of the mechanism plate, which is provided with an exposure aperture 63 aligned with lens 14. A light wire spring 64 biases the shutter blade in a clockwise direction to maintain its upwardly extending tongue 65 in contact with stop pin 66 so that the circular lower portion of the blade is aligned with aperature 63. During the cocking movement of the operating member, shutter operating ear 49 engages the upper tip of the shutter blade tongue and cams it forwardly so that ear 49 can move past the blade tongue. When the operating member is fully cocked, ear 49 is therefore to the right of the upper tip of the blade tongue as shown in FIG. 3.

Socket member 67 (FIG. 2) is indexably or rotatably mounted to the mechanism plate and is adapted to receive a conventional flash unit or flashcube provided with four flash lamps. The socket member is provided with a generally square hub 68 engaged by a flat detent spring 69 that resiliently holds it at 90° angular increments so that one of the flash units will always face toward the object to be photographed. The base of hub 68 includes four indexing lugs 71 horizontally aligned with a resilient indexing blade 72 carried by the operating member. During the cocking movement of the operating member from the position shown in FIG. 1 to the position shown in FIG. 3, lip 73 of the indexing blade engages the adjacent indexing lug and drives the socket member in a counterclockwise direction through somewhat less than a quarter revolution. Before the indexing blade disengages the socket indexing lug, the socket member has rotated to a position at which the detent spring will complete its quarter revolution movement, thereby aligning the next available flash lamp with the photographed subject.

After the camera mechanism has been cocked, as described above, the continuing rotation of the winding member causes the largest peripheral increment of the spiral driven gear to rotate out of mesh with the circular driving gear. When this occurs, spring 30 moves the cocking lever to the position shown in FIG. 4, in which its rounded end 52 abuts against blocking ear 74 of the cocked operating member. In this position, the minimum radius portion of the spiral gear is spaced slightly from the circular gear, which can rotate without producing further movement of the cocking lever.

As previously mentioned, the subject mechanism is preferably designed to utilize as much of the film winding rotation as possible to effect cocking of the operating member. Therefore, relatively little further rotation of the winding member brings the next perforation 16' (FIG. 4) into alignment with tip 38 of the metering member. When this occurs, the tip of the metering member enters that film perforation as shown in FIG. 4 and the movement of the film displaces the metering member to move pawl 42 into engagement with the ratchet wheel in opposition to springs 39 and 43. Further advancement of the film is therefore temporarily blocked and a predetermined unexposed film area is properly positioned for exposure.

Figure 5:
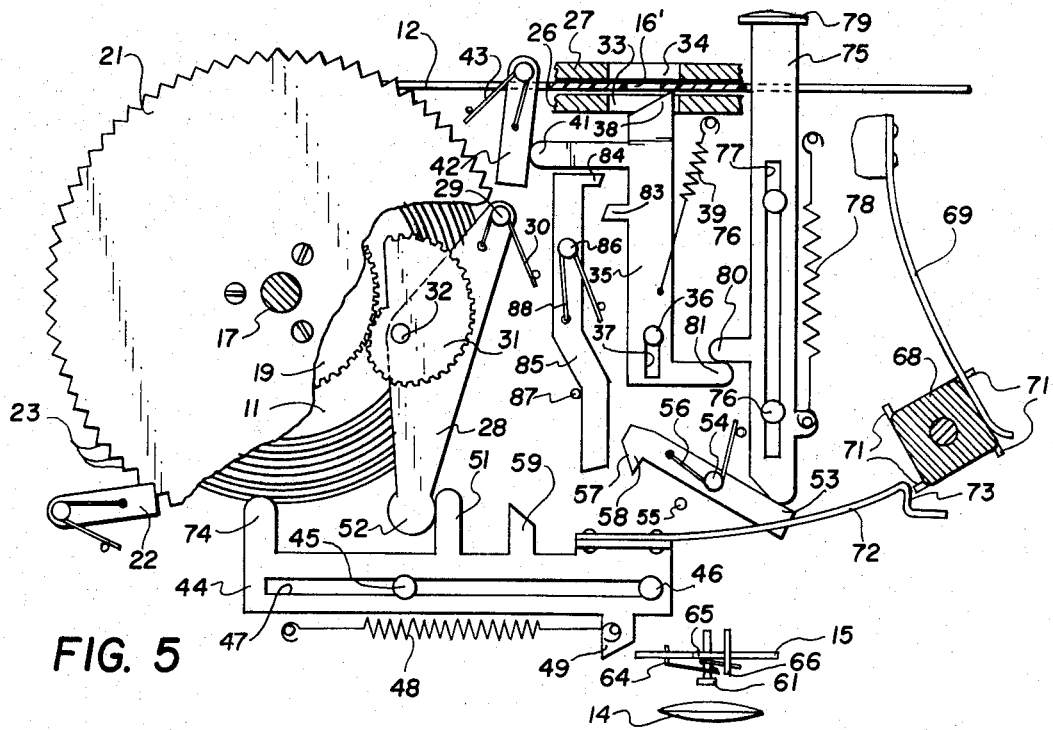
FIG. 5 shows the subject mechanism with its shutter operating slide depressed to operate the camera shutter and to restore the various mechanism components to their initial positions illustrated in FIG. 1.

A shutter release slide 75 is slidably supported by rivets 76 extending through slot 77 and is biased rearwardly by a spring 78. When the photographer depresses the release slide push button 79 to produce a photograph, the release slide engages and releases latch dog 53 as shown in FIG. 5. Accordingly, the spring-loaded operating member moves rapidly back to its initial position, thus causing shutter opening ear 49 to momentarily open the shutter by moving blade 15 to the position shown in broken lines in FIG. 2. The return of the operating member to its initial position also moves blocking ear 74 beyond the rounded end of the cocking lever and thereby allows the spiral gear to reengage the circular gear without appreciable impact. Simultaneously, the shutter releasing movement of slide 75 causes slide ear 80 to engage reset ear 81 of the metering member and to withdraw that member from the film perforation. The metering member therefore assumes the position shown in FIG. 5 and pawl 42 disengages the ratchet wheel. When the push button is released, the metering member and the latch dog both return to their initial positions depicted in FIG. 1 so that the subsequent film winding and cocking operation can proceed in the same manner just described.

Figure 6:
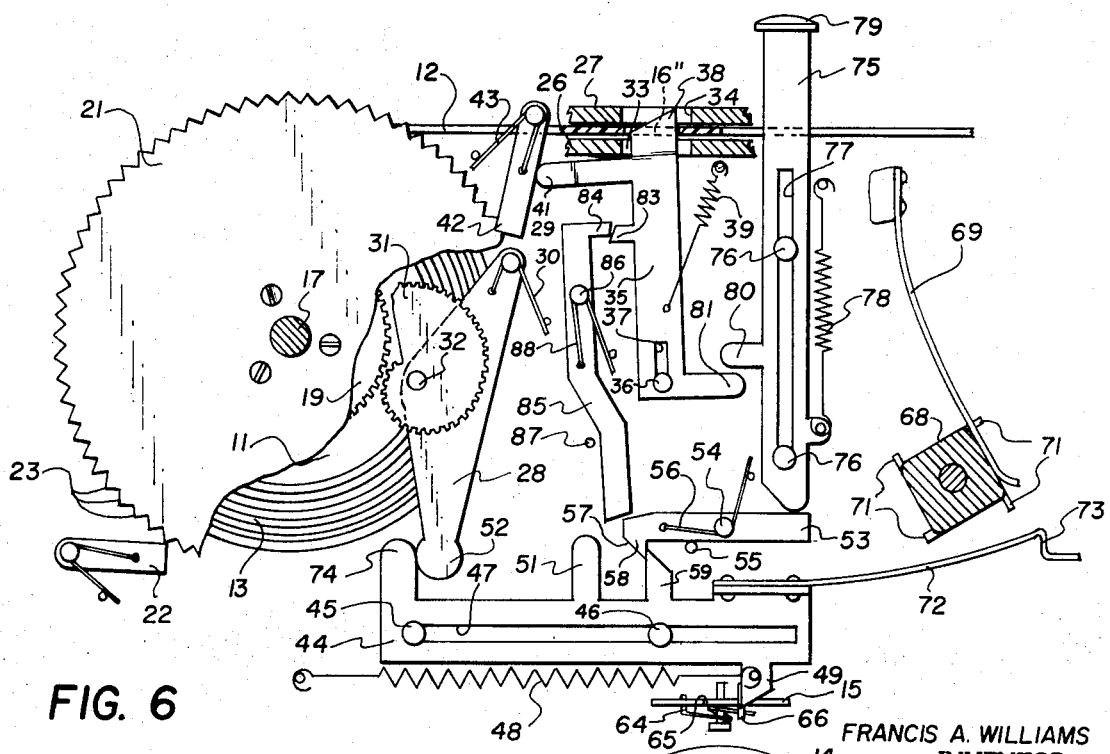
FIG. 6 corresponds generally to FIG. 4 but illustrates the manner in which the metering mechanism prevents further advancement of the film and operation of the shutter after all of the available film exposure areas have been exposed and wound past the exposure position.

After all of the available film areas have been exposed, the final rotation of the winding member causes the last exposed film area to be wound onto the film take-up roll before a final perforation 16'' arrives in alignment with the metering member. Because of the longer length of this final perforation, the tip of the metering member passes through that perforation as shown in FIG. 6 to bring tongue 83 on the metering member into alignment with a corresponding tongue 84 on disabling lever 85, which is pivotally supported by rivet 86 and biased toward stop pin 87 by spring 88. The final movement of the film displaces the metering member as shown in FIG. 6 and thus blocks further rotation of the winding member by means of pawl 42 in the same manner previously described. Simultaneously, the angular movement of the metering member rotates the disabling lever in opposition to spring 88 so that the lower end of that lever blocks the latch dog from moving out of engagement with latching ear 59 of the operating member. Accordingly, push button 79 cannot be depressed and the operator is thus alerted to replace the camera film.

Although the illustrative embodiment of the invention employs a spiral gear meshed with and driven by a circular gear, it should be recognized that a corresponding spiral driven member could be rotated by a smooth circular driving member through frictional engagement. For example, the spiral edge of the driven member might bear against a rubber or plastic tire corresponding to the illustrative circular gear. Alternatively, the edges of both the driving and driven members might be provided with fine knurling or the like to provide positive driving engagement similar to that of two conventional meshing gears. It also should be apparent that the radius of the driven member need not vary as a fixed function of its angular rotation but can be altered to provide a non-linear change in the gear ratio as the cocking lever is displaced. Additionally, it should be apparent that the circular gear could be driven by film or other movement, rather than being utilized to move the film. An illustrative embodiment of photographic apparatus incorporating the present invention with such an arrangement is described in the cross-referenced related application, U.S. Patent Application Ser. No. 23,642, entitled PHOTOGRAPHIC APPARATUS and filed Mar. 30, 1970 in the name of Donald M. Harvey. Although the invention has been described in connection with manually operated cameras, it obviously is equally applicable to cameras in which the film winding operation is performed by an electric or spring-powered motor.

The invention has been described in detail with particular reference to the preferred embodiment thereof, but it will be understood that variations and modifications can be effected within the spirit and scope of the invention.

I claim

1. A mechanism for moving a shutter actuating member to a cocked position in a camera having a drive member rotatable with movement of film in the camera, said mechanism comprising:
   a motion transmitting member engageable with the shutter actuating member and movable relative to the drive member to move the shutter actuating member to the cocked position; and
   a spiral-shaped gear having an axis and a peripheral portion, said gear being mounted on said motion transmitting member for rotation about said axis, said peripheral portion being engageable with the drive member to effect rotation of said gear, translation of said axis, and movement of said motion transmitting member relative to the drive member, thereby moving the shutter actuating member to its cocked position, in response to rotation of the drive member.

2. The mechanism claimed in claim 1 wherein the camera also has an indexable socket, and further comprising an indexing member coupled to the shutter actuating member and engageable with the socket to index the socket as the shutter actuating member is moved to its cocked position.

3. The mechanism claimed in claim 1 wherein said gear provides an effective mechanical advantage, for transmitting a force from the drive member to the shutter actuating member, which changes with rotation of said gear.

4. A cocking mechanism for use in a camera in which an elongate strip of film is advanced past an exposure position by being wound onto a rotatable film-winding member, the camera including:
  a. operating means for imparting rotation to the film-winding member;
  b. a reciprocable member movable between a first position and a second position; and
  c. spring means for biasing the reciprocable member toward the first position; said mechanism comprising:
  d. a circular driving member rotatable in response to rotation of the film-winding member;
  e. a driven member rotatable about a predetermined rotational axis and having a peripheral surface that spirals outwardly relative to said axis from a minimum radius to a maximum radius;
  f. support means movable toward and away from said driving member and rotatably supporting said driven member to permit engagement of said peripheral surface with said driving member and movement of said axis relative to said driving member;
  g. resilient means biasing said support means toward said driving member for urging said peripheral surface into engagement with said driving member at a position substantially coincident with said minimum radius to impart rotation of said driving member to said driven member and thus cause rotation of said driven member from said minimum radius position through a position substantially coincident with said maximum radius, thereby moving said support means and said driven member away from said driving member until said maximum radius position is reached and then allowing said resilient means to urge said support means and said driven member back toward said driving member after said maximum radius position is passed; and
  h. movement translating means operatively associating said support means with the reciprocable member for translating movement of said axis away from said driving member into movement of the reciprocable member from the first position to the second position.

5. The mechanism claimed in claim 4 wherein said driving member is a circular spur gear, and wherein said driven member is a spiral-shaped spur gear.

6. The mechanism claimed in claim 4 further comprising:
  i. a rotatable socket member adapted to support a multiple lamp flash illumination unit; and
  j. a socket indexing member engageable with said socket member and movable by the reciprocable member to rotate said socket member through a predetermined angle in response to movement of the reciprocable member from the first position to the second position.

7. A cocking mechanism for use in a camera in which an elongate strip of film is advanced past an exposure position by being wound onto a rotatable film-winding member, the camera including:
  a. operating means for imparting rotation to the film-winding member;
  b. a reciprocable member movable between a first position and a second position; and
  c. spring means for biasing the reciprocable member toward the first position; said mechanism comprising:
  d. a circular driving member rotatable in response to rotation of the film-winding member;
  e. a driven member rotatable about a predetermined rotational axis and having a peripheral surface that spirals outwardly relative to said axis from a minimum radius to a maximum radius;
  f. support means movable toward and away from said driving member and rotatably supporting said driven member to permit engagement of said peripheral surface with said driving member and movement of said axis relative to said driving member;
  g. resilient means biasing said support means toward said driving member for urging said peripheral surface into engagement with said driving member at a position substantially coincident with said minimum radius to impart rotation of said driving member to said driven member and thus cause rotation of said driven member from said minimum radius position through a position substantially coincident with said maximum radius, thereby moving said support means and said driven member away from said driving member until said maximum radius position is reached and then allowing said resilient means to urge said support means and said driven member back toward said driving member after said maximum radius position is passed;
  h. movement translating means operatively associating said support means with the reciprocable member for translating movement of said axis away from said driving member into movement of the reciprocable member from the first position to the second position;
  i. latch means for releasably latching the reciprocable member in the second position in opposition to the spring means; and
  j. blocking means operable when the reciprocable member is latched in the second position for blocking said support means during its return movement toward said driving member to thereby temporarily maintain said driven member out of engagement with said driving member.

8. A cocking mechanism for use in a camera in which an elongate strip of film is advanced past an exposure position by being wound onto a rotatable film-winding member, the camera including:
  a. operating means for imparting rotation to the film-winding member;
  b. a reciprocable member movable between a first position and a second position; and
  c. spring means for biasing the reciprocable member toward the first position; said mechanism comprising:
  d. a circular driving member rotatable in response to rotation of the film-winding member;
  e. a driven member rotatable about a predetermined rotational axis and having a peripheral surface that spirals outwardly relative to said axis from a minimum radius to a maximum radius;
  f. support means movable toward and away from said driving member and rotatably supporting said driven member to permit engagement of said peripheral surface with said driving member and movement of said axis relative to said driving member;
  g. resilient means biasing said support means toward said driving member for urging said peripheral surface into engagement with said driving member at a position substantially coincident with said minimum radius to impart rotation of said driving member to said driven member and thus cause rotation of said driven member from said minimum radius position through a position substantially coincident with said maximum radius, thereby moving said support means and said driven member away from said driving member until said maximum radius position is reached and then allowing said resilient means to urge said support means and said driven member back toward said driving member after said maximum radius position is passed;
  h. movement translating means operatively associating said support means with the reciprocable member for translating movement of said axis away from said driving member into movement of the reciprocable member from the first position to the second position;
  i. latch means for releasably latching the reciprocable member in the second position in opposition to the spring means;
  j. blocking means operable when the reciprocable member is latched in the second position for blocking said support means during its return movement toward said driving member to thereby temporarily maintain said driven member out of engagement with said driving member;

k. a shutter adapted to be opened momentarily in response to movement of the reciprocable member from the second position to the first position; and l. manually operable latch release means for releasing said latch means from the reciprocable member to initiate movement of the reciprocable member from the second position to the first position by the spring means.

* * * * *